DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 11, 1971

886 O.G. 214

T886,011

SURFACE STATIC REDUCTION

Leon Edward Wolinski, Buffalo, N.Y., assignor to E. I. du Pont de Nemours and Company, Wilmington, Del.

Filed Feb. 3, 1970, Ser. No. 8,418
Int. Cl. B44d *5/04*
U.S. Cl. 117—46
No Drawing. 8 Pages Specification

A process for reducing the surface static level of a thermoplastic packaging material by applying a coating of ionizable liquids having a specific conductance of at least $1\times10^{-4}$ mhos. Optionally, the surface of the thermoplastic packaging material can be pretreated prior to coating to increase the surface polarity thereby increasing the degree of ionization of the coating liquid when applied. Low surface static improves the adhesion of printing inks, minimizes dust attraction, and reduces the tendency for sheets of the packaging material to adhere to one another.

Useful thermoplastic packaging materials include polyvinyl chloride; polystyrene; polyolefins, such as polyethylene and polypropylene; as well as polyesters, such as polyethylene terephthalate. Useful ionizable coating liquids include water; alcohols having 1 to 4 carbon atoms, such as methanol, ethanol, propanol and butanol; glycols, such as propylene glycol; fluorocarbons which are liquid at room temperature; and solutions of ionizable salts. Preferred ionizable coating liquids are (a) water or (b) an aqueous solution of zinc chloride and an alkyl aryl polyethylene glycol ether, each present on the surface of the thermoplastic packaging material in an amount of about 0.11 to 0.034 mg./ft.$^2$ based on the dry weight of each of the components.

A typical process sequence comprises:

(A) Subjecting a thermoplastic packaging material to a surface pretreatment such as (1) an electrical discharge in air, oxygen, nitrogen or chlorine of at least about 3,000 to 8,000 volts and 3 to 10 kilocycles, a watt density greater than about 30 watts per square inch with an electrode gap of about from 40 to 50 mils, or (2) a reducing flame of a gaseous mixture of hydrocarbon fuel, oxygen and nitrogen having a fuel equivalency ratio of about from 1.05:1.25 and an oxygen ratio of about 2.78 for a period of 0.01 to 0.05 second; and (B) Coating the pretreated surface by means including spraying, nip or doctor roll coating, or, preferably, by direct condensation, i.e., bringing the film surface into contact with the vapor of the ionizable coating liquid.